Jan. 28, 1964     J. B. FREED     3,119,624
LIP SEALS
Filed Nov. 18, 1960
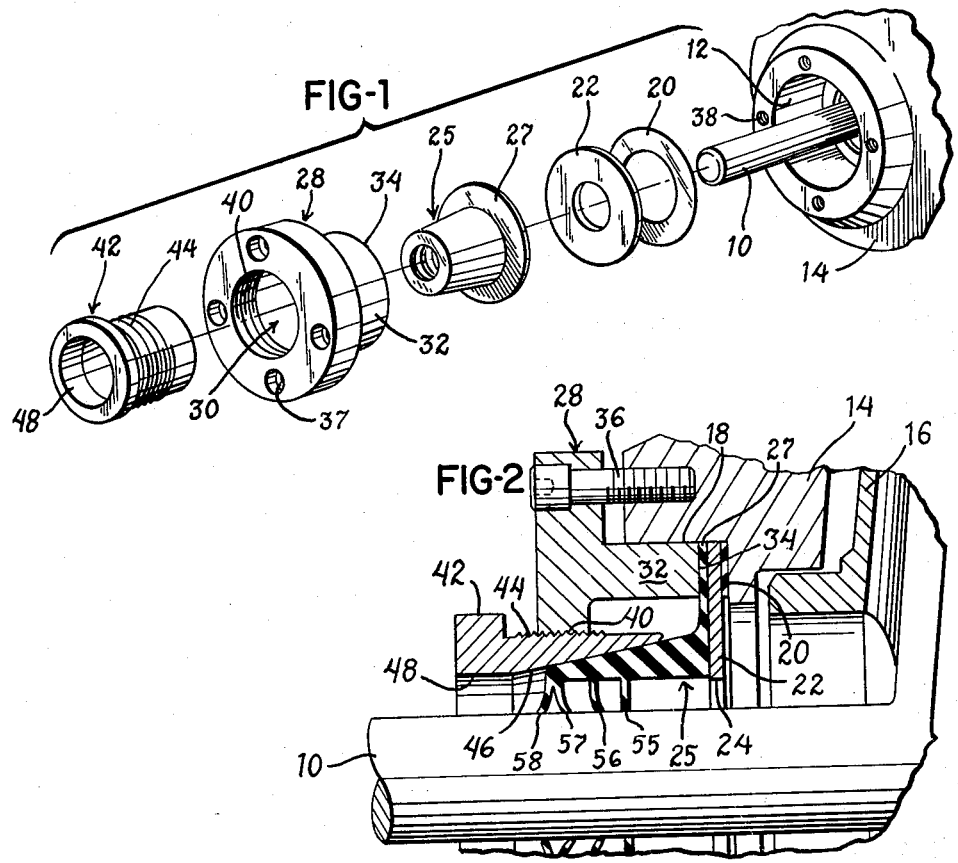
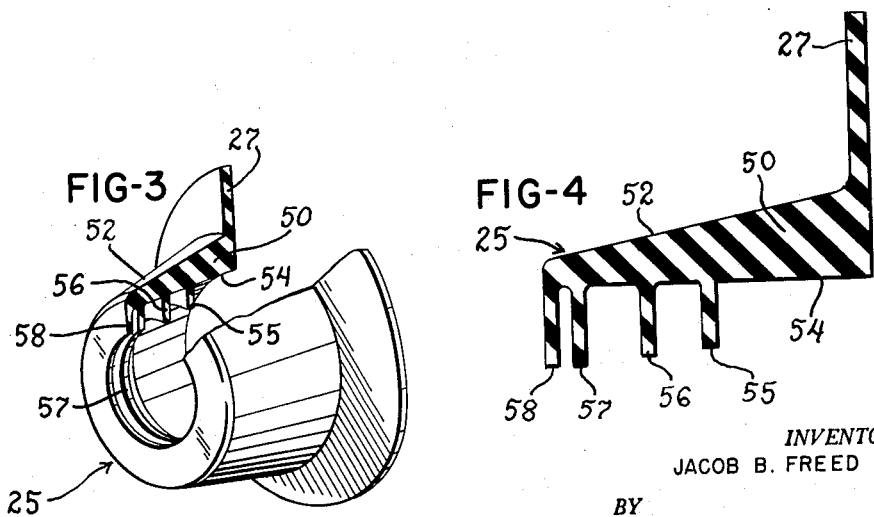
INVENTOR.
JACOB B. FREED
BY
*Marechal, Biebel, French & Bugg*
ATTORNEYS United States Patent Office
3,119,624
Patented Jan. 28, 1964

3,119,624
LIP SEALS
Jacob B. Freed, Dayton, Ohio, assignor to The Duriron Company, Inc., Dayton, Ohio, a corporation of New York
Filed Nov. 18, 1960, Ser. No. 70,305
8 Claims. (Cl. 277—115)

This invention relates to seal assemblies, and more particularly to a lip seal assembly for a moving shaft.

The use of lip seals to seal the junction between a housing and a rotating or reciprocating shaft offers definite advantages of simplicity and economy over stuffing boxes and rotary mechanical seals, particularly for installations where a pressure differential exists across the seal, as for example in the case of a centrifugal pump. Since there is necessarily constant friction between the lip portion of the seal diaphragm and the relatively moving part with which it is in engagement, wear is likely to occur on one or both of these parts, and some provision should be made to compensate for such wear. For example, Freed et al. Patent No. 2,945,709 shows a construction of lip seal assembly for a pump which is designed to facilitate replacement of worn seal diaphragms without disassembly of any of the main parts of the pump or withdrawal of the shaft.

It is a primary object of the present invention to provide a lip seal assembly of novel construction for a rotating or reciprocating shaft wherein wear between the seal diaphragm or diaphragms and the mating relatively moving surface therefor is quickly and easily compensated for by movement of an adjusting member axially of the shaft without the necessity for springs or other force.

Another object of the invention is to provide an adjustable lip seal assembly as outlined above which is readily produced with different numbers of seal diaphragms in accordance with the particular pressure conditions existing across the junction to be sealed.

A further object of the invention is to provide an adjustable lip seal assembly for a rotating or reciprocating shaft wherein a sleeve of flexible material carries the seal diaphragm or diaphragms on the inner surface thereof and wherein wear of the diaphragm or diaphragms is compensated for by compression of this flexible sleeve toward the shaft.

Additional objects and advantages of the invention will be apparent from the following description, the accompanying drawing and the appended claims.

In the drawing:

FIG. 1 is an exploded view of a seal assembly constructed in accordance with the present invention;

FIG. 2 is a view partly in section and partly in elevation of the seal assembly of FIG. 1;

FIG. 3 is an elevated view in perspective with parts thereof broken away to expose the interior of the seal element in the assembly of FIGS. 1–2; and FIG. 4 is an enlarged sectional view of the seal element shown in FIG. 3.

Referring to the drawing, especially FIGS. 1 and 2, a rotary shaft 10 is positioned within the annular aperture 12 formed in the casing 14, which may be a pump casing, for example. Attached to one end of the shaft 10 is an impeller 16 adapted to turn as the shaft rotates. One surface of the pump casing 14 is provided with an annular seat 18 which is recessed into the pump casing, and an annular gasket 20 is positioned therein around the shaft and out of contact therewith. An annular backup plate 22 having an inner diameter preferably smaller than the inner diameter of gasket 20 and large enough to avoid contact between the inner periphery 24 of the backup plate and outer surface of the shaft 10 is mounted in the seat 18 in engagement with the gasket 20.

A seal element generally designated 25, having an integrally formed flange 27 extending radially outward therefrom, is positioned against the back-up plate 22. An annular mounting plate 28 having an aperture 30 therethrough and an annular shoulder 32 formed thereon in concentric relationship with the shaft is affixed to the pump casing 14 with the face 34 of the shoulder 32 abutting the flange 27 to maintain the seal element 25 in fixed relationship to the casing 14. The connection between the parts 28 and 14 may be provided by any of a wide variety of mechanical means, and it is shown as comprising a plurality of bolts 36 (one being shown) passing through the holes 37 circumferentially spaced around the mounting plate 28 and threaded into tapped holes 38 in the casing 14. Thus the mounting plate 28 is maintained in sealed relationship with the pump casing 14 by the seal provided between the face 34 of the shoulder 32, the flange 27, the back-up plate 22, the gasket 20 and the seat provided in the pump casing.

The interior surface 40 of the mounting plate 28 is formed with threads thereon for receiving an adjustment nut 42 which has a threaded portion 44 on the outer periphery thereof mating with the threaded portion 40 of the mounting plate. The interior surface of the adjustment nut 42 includes a tapered portion 46 adjacent a non-tapered portion 48, the inner diameter of the adjustment nut being sufficiently large to allow movement of the shaft 10 therethrough.

Referring to FIGS. 3 and 4, the seal element 25 is formed of rubber, neoprene, "Teflon" or other resilient material, and it includes an annular body portion 50, the outer surface 52 of which is preferably tapered. The annular flange 27 is formed integrally with the body portion 50 and extends radially outward therefrom. The internal surface 54 of the seal element is provided with annular spaced sealing lips 55, 56, 57 and 58, extending radially inward of the interior surface 54 on the side of the body portion 50 removed from the flange 27.

In the multiple lip assembly shown in FIG. 4, it is preferred that lip 55 extend inwardly of the interior surface 54 a distance such that as the seal element 25 is assembled in the seat 18, the inner periphery of the lip 55 barely clears the outer periphery of the shaft 10, as shown for example in FIG. 2. Lip 56 extends inward a greater distance, while lips 57 and 58 each extend inwardly the same distance, which is an amount greater than that of lip 56. Merely as illustrative, if lip 56 is in line-to-line contact with the outer surface of shaft 10, satisfactory results are obtained if lip 56 is provided with a 1/16 inch interference with the shaft while lips 57 and 58 each have a 1/8 inch interference or engagement with the shaft.

In operation, subsequent to placing the gasket 20 and the back-up plate 22 in the seat, the seal is assembled over the shaft 10 with the annular flange 27 positioned against the back-up plate and within the seat 18. The mounting plate 28 is placed over the shaft and secured to the pump casing 14 thereby providing a seal with the casing 14 across the annular flange 27. The adjustment nut 42 is threaded through the aperture in the mounting plate 28, and the tapered portion 46 thereof engages the tapered outer surface 52 of the seal to urge the lips into engagement with the shaft. As the shaft or lips wear down, the adjustment nut 42 may be advanced toward the seal 25 to urge the lips toward the shaft, and thus to compensate for such wear. During normal operation of the pump assembly, the shaft is sealed by each of the lip seals which engage the shaft along the outer periphery thereof.

The use of a plurality of lips is preferred, since in cases where the seal assembly is used under such circumstances that a pressure differential exists across the seal due to vacuum or positive pressure on the impeller side of the seal, the provision of a plurality of lips serves to assure proper sealing. A single lip, or a different number of lips may be employed, however, the same advantages of adjustability to compensate for wear will be achieved.

In those installations where a pressure differential exists across the seal, this pressure differential plus the tapered arrangement of the adjustment nut and the annular body portion serve to maintain the lips in sealing engagement with the shaft. For example, if the pressure on the impeller side of the seal is less than the pressure on the adjustment nut side of the seal, such pressure differential acting in cooperation with the tapered configuration of the various elements assists in deforming lip 58 into sealing engagement with the shaft. In instances where the pressure on the impeller side of the seal is greater than the pressure on the adjustment nut side, such pressure cooperates with the tapered configuration of the elements and is effective on lips 56 and 57 to maintain them in sealing engagement with the shaft, it being understood that lip 55 is normally positioned such that it contacts the outer surface of the shaft.

While the interior surface of the sealing element 27 and the interior surface of the adjustment nut 42 are both shown as of tapered configuration, this need not be the case. Tapering of the one with respect to the other is sufficient to accomplish adjustment of the lip elements, but experience has shown that tapering the contacting portions of both elements provides a smoother adjustment. Moreover, the interior surface of the seal need not be smooth, but may be tapered or convoluted, provided the lip elements extend inwardly thereof so as to make contact with the shaft and allow sufficient adjustment thereof to compensate for wear of the seal or shaft.

While the pump casing has been shown as recessed to provide an annular seat, and the mounting plate has been provided with an annular shoulder thereon, it is understood that such arrangement can be reversed to provide a seat in the mounting plate and a shoulder may be provided on the casing much in the same manner as was done in my application Serial No. 70,286 filed of even date herewith and assigned to the same assignee.

While the forms of apparatus herein described constitute preferred embodiments of the invention, it is to be understood that this invention is not limited to these precise forms of apparatus, and that changes may be made therein without departing from the scope of the invention which is defined in the appended claims.

What is claimed is:

1. An adjustable seal construction for the junction between a driven shaft and one end of a housing, comprising a casing having an aperture therethrough provided with an annular seat in one portion thereof, a shaft extending through said aperture and adapted to move relative to said casing, a sealing element including a flexible annular body portion positioned around said shaft, an annular flange extending radially outward from said body portion and positioned in said seat, a mounting plate fixed to said casing and surrounding said shaft and body portion, means securing said mounting plate to said casing in clamping relation with said flange, at least one flexible annular lip extending radially inwardly of said body portion for engagement with said shaft along the outer periphery thereof, said lip being integral with said body portion and extending therefrom with the axis of said annular lip being generally at a right angle with respect to the axis of said shaft, an adjustment element positioned between said body portion and said mounting plate in telescoping relation therewith for advancement toward said casing, the interior surface of said element engaging the exterior surface of said body portion, and at least one of said surfaces being of tapered configuration to effect compression of said body portion and movement of said lip radially inwardly for increased sealing engagement of each said lip with said shaft in response to the movement of said element toward said housing.

2. An adjustable seal construction for the junction between a driven shaft and one end of a housing, comprising a casing having an aperture therethrough provided with an annular seat in one portion thereof, a shaft extending through said aperture and adapted to rotate relative to said casing, a sealing element including a flexible annular body portion having an exterior surface of tapered configuration, an annular flange extending radially outward from said body portion and positioned in said seat, a mounting plate fixed to said casing and surrounding said shaft and body portion, means securing said mounting plate to said casing in clamping relation with said flange, an adjustment element positioned between said body portion and said mounting plate in telescoping relation therewith for advancement toward said casing, at least one flexible annular lip extending radially inwardly of said body portion for engagement with said shaft along the outer periphery thereof, said lip being integral with said body portion and extending therefrom with the axis of said annular lip being generally at a right angle with respect to the axis of said shaft, and said adjustment element having an internally tapered surface engaging the tapered surface of said body portion for urging said lip radially inwardly into sealing engagement with said shaft in response to the advancing movement of said element toward said housing.

3. An adjustable seal assembly for the junction between a driven shaft and one end of a housing and wherein a pressure differential exists across said seal assembly, comprising a casing having an aperture therethrough provided with a seat in one portion thereof, a driven shaft extending through said aperture and adapted to move relative to said casing, a sealing element including a flexible annular body portion having a tapered outer surface, a flange extending radially outward from said body portion and positioned in said seat, a mounting plate fixed to said casing and surrounding said shaft and body portion and maintained in clamping relation with said flange, at least one annular lip extending radially inward of said body portion for engagement with said shaft along the outer periphery thereof, said lip being integral with said body portion and extending therefrom with the axis of said annular lip being generally at a right angle with respect to the axis of said shaft, an adjustment nut positioned between said mounting plate and said body portion and threadably engaging said mounting plate in telescoping relation therewith for advancement toward said casing, and said adjustment nut having an internally tapered surface engaging the tapered surface of said body portion and cooperating with said pressure differential for urging said lip radially inwardly into sealing engagement with said shaft in response to the threaded movement of said nut towards said housing.

4. An adjustable seal construction for the junction between a driven shaft and one end of a housing, comprising a casing having an aperture therethrough provided with a seat in one portion thereof, a shaft extending through said aperture and adapted to move relative to said casing, a sealing element including a flexible annular body portion, a flange extending radially outward from said body portion and positioned in said seat, a mounting plate fixed to said casing and surrounding said shaft and body portion, means securing said mounting plate to said casing in clamping relation with said flange, a plurality of spaced flexible annular lips extending radially inwardly of said body portion for engagement with said shaft along the outer periphery thereof, each said lip being integral with said body portion and extending therefrom with the axis of each said lip being generally at a right angle with respect to the axis of said shaft, an adjustment nut positioned between said body portion and said mounting plate and threadably engaging said mounting plate in telescoping relation therewith for advancement toward said casing, the interior surface of said nut engaging the exterior surface of said body portion, and one of said surfaces being of tapered configuration to effect compression of said body portion and movement of said lip radially inwardly for increased sealing engagement of each said lip with said shaft in response to the threaded movement of said nut toward said housing.

5. An adjustable seal for the junction between a driven shaft and one end of a housing and wherein a pressure differential exists across said seal assembly, comprising a casing having an aperture therethrough provided with a seat in one portion thereof, a driven shaft extending through said aperture and adapted to move relative to said casing, a sealing element including a flexible annular body portion having a tapered outer surface, a flange extending radially outward from said body portion and positioned in said seat, a mounting plate fixed to said casing and surrounding said shaft and body portion and maintained in clamping relationship with said flange, a plurality of spaced flexible annular lips extending radially inwardly of said body portion for engagement with said shaft along the outer periphery thereof, each said lip being integral with said body portion and extending therefrom with the axis of each said annular lip being generally at a right angle with respect to the axis of said shaft, an adjustment nut of annular configuration positioned between said mounting plate and said body portion and threadably engaging said mounting plate in telescoping relation therewith for advancement toward said casing, and said adjustment nut having an internally tapered surface engaging the tapered surface of said body portion and cooperating with said pressure differential for urging said lips radially inwardly into sealing engagement with said shaft in response to the threaded movement of said nut toward said housing.

6. An adjustable seal construction for the junction between a driven shaft and one end of a housing, comprising a casing having an aperture therethrough provided with a seat in one portion thereof, a shaft extending through said aperture and adapted to move relative to said casing, a sealing element including a flexible annular body portion having an external surface of tapered configuration, a flange extending radially outward from said body portion and positioned in said seat, a mounting plate fixed to said casing and surrounding said shaft and body portion, means securing said mounting plate to said casing in clamping relation with said flange, an adjustment nut positioned between said body portion and said mounting plate and threadably engaging said mounting plate in telescoping relation therewith for advancement toward said casing, at least three spaced flexible annular lips extending radially inwardly of said body portion at least a distance sufficient to engage said shaft along the outer periphery thereof, each said lip being integral with the body portion and extending therefrom with the axis of each said annular lip being generally at a right angle with respect to the axis of the shaft, and said adjustment nut having an internally tapered surface engaging the tapered surface of said body portion for urging said lips radially inwardly into sealing engagement with said shaft in response to the threaded movement of said nut toward said housing.

7. An adjustable seal construction for the junction between a driven shaft and one end of a housing, comprising a casing having an aperture therethrough provided with a seat in one portion thereof, a shaft extending through said aperture and adapted to move relative to said casing, a sealing element including a flexible annular body portion, a flange extending radially outward from said body portion and positioned in said seat, a mounting plate fixed to said casing and surrounding said shaft and body portion, means securing said mounting plate to said casing in clamping relation with said flange, at least three flexible lips extending inwardly of said body portion, the first of said lips extending inwardly a first distance sufficient to engage the outer periphery of said shaft, the second lip extending inwardly a second distance greater than said first distance, the third lip extending inwardly a third distance greater than said second distance, an adjustment nut positioned between said body portion and said mounting plate and threadably engaging said mounting plate in telescoping relation therewith for advancement toward said casing, the interior surface of said adjustment nut engaging the exterior surface of said body portion, and one of said surfaces being of tapered configuration to effect compression of said body portion and increased sealing engagement of each of said lips with said shaft in response to the threaded movement of said nut toward said housing.

8. An adjustable seal assembly for the junction between a driven shaft and one end of a housing, comprising a casing having an aperture therethrough and provided with a seat in one portion thereof, a driven shaft extending through said aperture and adapted to move relative to said housing, a flexible sealing element including an annular body portion, a flange extending radially outward from said body portion positioned in said seat, a mounting plate fixed to said casing and surrounding said shaft and body portion and maintained in clamping relation with said flange, at least four spaced flexible annular lips extending inwardly of said body portion, the first of said lips extending inwardly a first distance sufficient to engage the outer periphery of said shaft, the second lip extending inwardly a second distance greater than said first distance, the third and fourth lips each extending inwardly a third distance greater than said second distance, an adjustment nut of annular configuration positioned between said mounting plate and said body portion and threadably engaging said mounting plate in telescoping relation therewith for advancement toward said casing, the interior surface of said adjustment nut engaging the exterior surface of said body portion, and one of said surfaces being of tapered configuration to effect compression of said body portion and increased sealing engagement of each of said lips with said shaft in response to the threaded movement of said nut toward said housing.

References Cited in the file of this patent
UNITED STATES PATENTS

| | | |
|---|---|---|
| 2,021,414 | Gits | Nov. 19, 1935 |
| 2,568,056 | Corder | Sept. 18, 1951 |